(12) United States Patent
Morrow (10) Patent No.: US 7,337,272 B2
(45) Date of Patent: Feb. 26, 2008

(54) METHOD AND APPARATUS FOR CACHING VARIABLE LENGTH INSTRUCTIONS

(75) Inventor: Michael William Morrow, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 11/381,038

(22) Filed: May 1, 2006

(65) Prior Publication Data

US 2007/0255905 A1   Nov. 1, 2007

(51) Int. Cl.
*G06F 12/04* (2006.01)
(52) U.S. Cl. ...................................... 711/125
(58) Field of Classification Search ............... 711/125, 711/129, 201
See application file for complete search history.

(56) References Cited

U.S. PATENT DOCUMENTS

| | | | | |
|---|---|---|---|---|
| 5,802,323 | A * | 9/1998 | Bujanos et al. | 710/107 |
| 6,393,549 | B1 * | 5/2002 | Tran et al. | 712/204 |
| 7,243,172 | B2 * | 7/2007 | Oner et al. | 710/66 |
| 2004/0098556 | A1 * | 5/2004 | Buxton et al. | 711/201 |

* cited by examiner

*Primary Examiner*—Kevin L. Ellis
(74) *Attorney, Agent, or Firm*—Nicholas J. Pauley; John L. Ciccozzi; Thomas Rouse (57) ABSTRACT

An instruction cache controller uses supplemental memory to store a redundant copy of cached instruction data corresponding to a cache boundary position, and thereby enables subsequent single cache access retrieval of an instruction that crosses that boundary position. In one or more embodiments, the cache controller duplicates instruction data for the post-boundary position in the supplemental memory, and multiplexes that copied data into cache data obtained from the pre-boundary position.

37 Claims, 6 Drawing Sheets

METHOD AND APPARATUS FOR CACHING VARIABLE LENGTH INSTRUCTIONS

FIELD

The present disclosure generally relates to instruction caching, and particularly relates to caching variable-length instructions.

BACKGROUND

A microprocessor's word length denotes the length (in bits or bytes) of its basic working unit of data. For example, a 32-bit microprocessor has a nominal word length of 32-bits (4-bytes). With a uniform length instruction set, instructions commonly are stored in memory on natural word boundaries. Some microprocessors, however, use variable-length instructions, such as a mix of 32-bit and 16-bit instructions, or a mix of 64-bit and 32-bit instructions. Support for shorter-length instructions offers, in some cases, legacy compatibility, and provides an opportunity for a smaller instruction memory footprint, at least for applications that can make use of the shorter instructions.

However, realizing the memory savings requires storing the variable length instructions on non-natural boundaries. Memory in which instructions are not necessarily stored on natural word boundaries may be considered as non-aligned memory, while memory in which instructions are stored on natural word boundaries may be considered as aligned memory. As one example where non-aligned memory may be used, the ARM v7 family of microprocessors support word and half-word instructions, and allow 4-byte instructions to be stored across 4-byte boundaries.

While the use of non-aligned memory for instruction storage is space-efficient, the lower-latency instruction buffers which are used to enhance instruction execution performance, commonly use a natural word-alignment. For example, cache memories often are organized into cache lines that buffer word-aligned segments (lines) of external memory, which may be main memory, or a higher level of cache memory.

Reading non-aligned instructions into aligned cache lines means that boundary locations in the cache line may or may not include complete instruction words. That is, word-length instructions may cross cache boundaries. Inter-line boundaries, i.e., the break over from one cache line to the next, represent one type of cache boundary, while intra-line boundaries, such as word-aligned segment boundaries within each cache line, represent another type of cache boundary. Segment boundaries may arise from the use of word-aligned read ports that are less than the full cache line width.

Retrieving cross-boundary instructions from conventional caches requires two accesses: a first access to read out the instruction data in advance of the boundary position, and a second access to read the instruction data after the boundary position. The second access retrieves the trailing (post-boundary) portion of the border-crossing instruction. Obviously, the prevalence of misaligned instructions in cache memory negatively influences overall caching performance, because the extra cache reads required for retrieving the trailing portions of misaligned, cross-boundary instructions.

SUMMARY OF THE DISCLOSURE

According to the methods and apparatus taught herein, an instruction cache controller uses supplemental memory to store a redundant copy of cached instruction data corresponding to a cache boundary position, and thereby enables subsequent single cache access retrieval of an instruction that crosses that boundary position. In one or more embodiments, the cache controller duplicates instruction data for the post-boundary position in the supplemental memory, and multiplexes that copied data into cache data obtained from the pre-boundary position.

One embodiment of a cache controller and method caches instructions by writing instruction data to a cache line and, for one or more boundary positions in that line, storing redundant copies of the instruction data in those boundary positions, e.g., the half-words at each post-boundary position. Such operations enable the retrieval of whole non-aligned instructions from the cache based on reading pre-boundary data from the cache line and reading post-boundary data from an auxiliary memory used to store the boundary data.

In one embodiment of a cache controller, the controller is configured to direct storage of instruction data to a cache line included in an instruction cache and to direct storage of a redundant copy of instruction data for one or more cache boundary positions. The redundant data is stored in an auxiliary memory, such as a tag array associated with the instruction cache, one or more additional memory elements included in or associated with the instruction cache, a separate memory array, or a higher-level cache.

The cache controller may be included in a microprocessor. In one embodiment, the microprocessor comprises an instruction cache and the cache controller. The instruction cache is configured to cache lines of instruction data, and the cache controller is configured to store redundant copies of instruction data corresponding to boundary positions of the cache lines in an auxiliary memory. The auxiliary memory may be integrated in the cache memory comprising the cache lines, or may be implemented elsewhere in the cache controller or microprocessor.

Of course, the present disclosure is not limited to the above embodiments. Those skilled in the art will recognize additional possible embodiments upon reading the following detailed description, and upon viewing the accompanying drawings.

DETAILED DESCRIPTION

Figure 1:
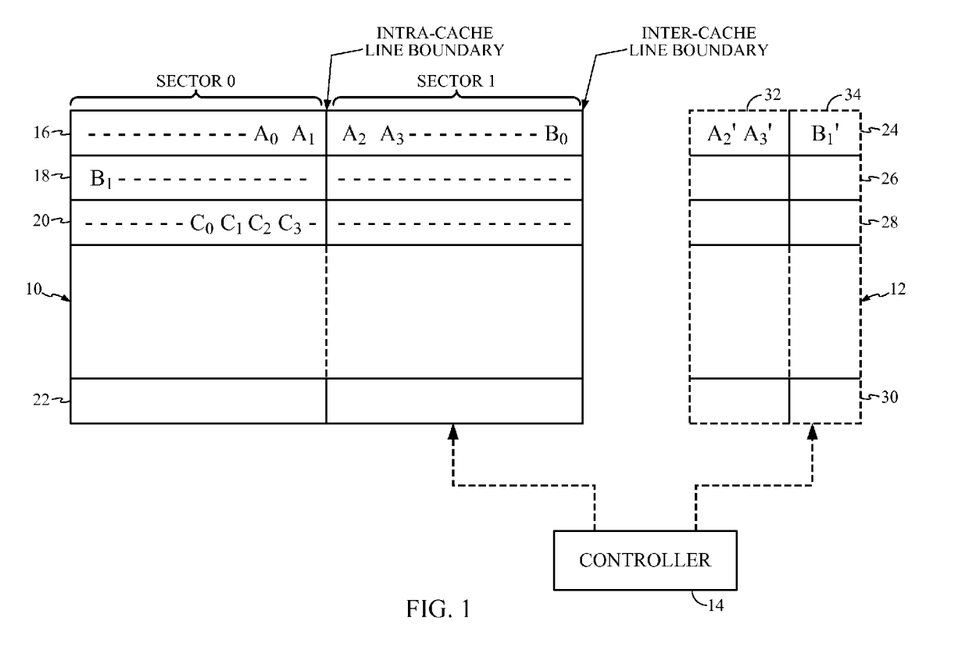
FIG. 1 is a block diagram illustrating an embodiment of an instruction cache and an auxiliary memory.

FIG. 1 illustrates an embodiment of an instruction cache 10 and an auxiliary memory 12 included in or associated with the cache 10. Instruction caching transactions directed to the instruction cache 10 are managed by a controller 14, which is configured to use the auxiliary memory 12 for storing redundant copies of instruction data for one or more boundary positions in the cache 10. Further, the controller 14 manages instruction data retrieval from the cache 10, such that at least some misaligned instructions stored in cache 10 are retrieved in a single access. The controller 14 enables single-access retrieval of misaligned instructions from the cache 10 by combining pre-boundary data from the cache 10 with post-boundary data from the auxiliary memory 12.

These operations by the controller 14 improve cache performance by eliminating or greatly reducing the performance penalty that would otherwise result from caching non-aligned instructions. Such operation improves performance in systems that use variable-length instruction sets and use non-aligned memory for instruction data storage. That is, the instruction data received from a higher-level cache or external memory (both not shown) for storage in the instruction cache 10 may comprise a mix of instructions having different lengths, meaning that instruction boundaries will not necessarily match cache boundaries. In such circumstances, the cache controller 14 uses redundant storage of post-boundary data for one or more cache boundary positions to reduce the adverse effects of cache boundary violations caused by storing variable length instructions in a fixed-width cache.

In some embodiments, the controller 14 stores post-boundary instruction data regardless of whether the data includes a misaligned instruction, i.e., an instruction having one or more segments that cross a cache boundary. As such, the controller 14 does not determine whether a particular instruction is misaligned. Instead, for one or more boundary positions in the cache 10, the controller 14 stores a redundant copy of the boundary position data in the auxiliary memory 12 as part of its regular cache filling operations. In such embodiments, the controller 10 does not determine whether the boundary data actually represents a partial instruction, it simply duplicates the instruction data in the post-boundary position on the chance that it represents the trailing portion of an instruction stored in the pre-boundary position.

As one example, each cache line may have a segment boundary representing a half-line read port width. The controller 14 can be configured to store redundantly (via auxiliary memory 12) the half-word in the cache line positioned immediately after the segment boundary, such that it can be retrieved in conjunction with retrieving the half-word positioned immediately before the segment. Additionally, or alternatively, the controller 14 can be configured to treat the first half-word in a succeeding cache line as the trailing portion of the half-word position at the end-of-line boundary separating each cache line. In such configurations, the controller 14 stores a redundant copy of instruction data in the beginning position of each next cache line as the trailing portion of instruction data is stored in the ending position of each cache line. In that manner, instructions breaking over cache lines can be retrieved in single cache accesses.

Simplicity of operation is one advantage of copying boundary position data blindly into the supplemental memory 12. That is, the logical operation of the controller 14 is simplified by not attempting to determine whether boundary positions in the cache actually contain boundary-crossing instruction data. However, in other embodiments, the controller 14 selectively stores redundant copies of boundary position data, based on, for example, pre-decoding operations that identify or at least suggest whether boundary position data represents complete half-word instructions or boundary-crossing full-word instructions.

According to such embodiments, the controller 14 selectively determines which instruction data is to be stored in the auxiliary memory 12 in response to one of various misalignment indicators. Although the controller 14 includes additional processing logic complexity to support identifying and selectively storing misaligned instruction data, the method offers increased utilization efficiency of the auxiliary memory 12, because boundary position data is not blindly written into it. However, regardless of whether the controller 14 blindly or selectively copies boundary position data from the cache 10 into the auxiliary memory 12, such redundant instruction data storage enables single-cache access instruction retrieval.

In more detail, the instruction cache 10 comprises a number of cache lines 16-22, also referred to as cache blocks. Each cache line 16-22 is configured to store one or more instructions or segments of instructions read from an external memory source (not shown). Each cache line 16-22 has fixed storage capacity, i.e., line size, also referred to as block size. As such, the maximum quantity of data stored in a particular cache line is determined by the line size of the instruction cache 10. In addition, the cache lines 16-22 may be subdivided into sectors, e.g., sectors zero and one as illustrated in FIG. 1. In one embodiment, sector size corresponds to the memory port size associated with the instruction cache 10. For example, the instruction cache 10 may have a line size of 32 bytes and a memory port width of 16 bytes, thus resulting in two 16 byte sectors per cache line. As such, the exemplary cache lines 16-22 are filled by writing two 16-byte groups of data to the two sectors of a particular cache line. Those skilled in the art will readily understand that cache line size may be set to any desired value and the cache lines may be subdivided into any desired number of sectors.

Variable length instructions stored in the instruction cache 10 may cross one or more cache line boundaries, and thus, may be misaligned. The auxiliary memory 12 reduces the adverse effects associated with misaligned instructions by storing a redundant copy of misaligned instruction segments, i.e., the segments of an instruction that are stored across cache line boundaries. An instruction segment may equate to any size sequence of data associated with an instruction, e.g., words, half-words, bytes, nibbles, etc. As such, when one or more segments of an instruction stored in the instruction cache 10 lie outside a cache line boundary, a redundant copy of the misaligned segment(s) are stored in the auxiliary memory 12. The auxiliary memory 12 includes a number of rows 24-30 for storing misaligned instruction segments, each row having one or more columns 32-34. Thus, redundant copies of misaligned instruction segments are subsequently available for concurrent access along with the aligned segments of the instruction that are stored in the instruction cache 10, i.e., the segments of the instruction that do not cross a cache line boundary. As such, a boundary-crossing instruction stored in the cache 10 may be retrieved during a single instruction cache access by combining the aligned segment(s) of the instruction read from the instruction cache 10 with the misaligned segment(s) of the instruction read from the auxiliary memory 12.

Figure 2:
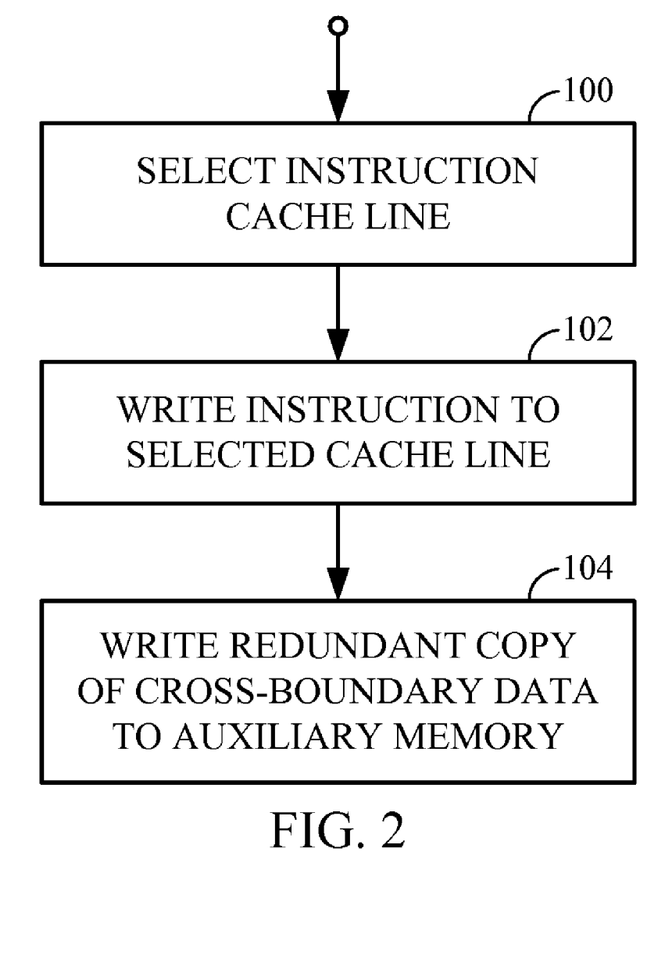
FIG. 2 is a logic flow diagram illustrating an embodiment of program logic for caching variable length instructions.

In a non-limiting example, the controller 14 selects a first cache line 16 of the instruction cache 10 for writing of instruction data, as illustrated by Step 100 of FIG. 2. A first instruction, e.g., having four segments $A_0$-$A_3$, is retrieved from external memory or another cache as part of the instruction data being written to the selected cache line, as illustrated by Step 102 of FIG. 2. The first instruction has two segments $A_2$ and $A_3$ that cross the intra-cache line boundary separating sectors zero and one in the first cache line 16. As such, a redundant copy $A_2'$ and $A_3'$ of the misaligned instruction segments $A_2$ and $A_3$ is written to the auxiliary memory 12, as illustrated by Step 104 of FIG. 2. The instruction data written to the first cache line 16 also comprises a first segment $B_0$ of a second instruction having two segments $B_0$ and $B_1$. The remainder of the instruction, segment $B_1$, is stored in another cache line, e.g., a second cache line 18, as part of a subsequent group of instruction data retrieved from external memory or another cache. For example, the first and second groups of instruction data are retrieved as part of a burst transaction that fills multiple lines of the cache 10.

Regardless of the particular mechanism that causes the second instruction segment $B_1$ to be written to the cache 10, the second segment $B_1$ is stored in a manner such that it crosses an inter-cache line boundary, e.g., the inter-cache line boundary that separates the first and second cache lines 16, 18 of the cache 10. As such, a redundant copy $B_1'$ of the misaligned instruction segment $B_1$ is stored in the auxiliary memory 12. A third group of instruction data subsequently retrieved by the controller 14 includes a third instruction having four segments $C_0$-$C_3$, which are stored in the third cache line 20. This instruction has no misaligned segments, and thus, no segments associated with the third instruction need be stored in the auxiliary memory 12. The auxiliary memory 12 contains no data relating to the third instruction because the third instruction is retrievable during one instruction cache access, e.g., by accessing sector zero of the third cache line 20.

Figure 3:
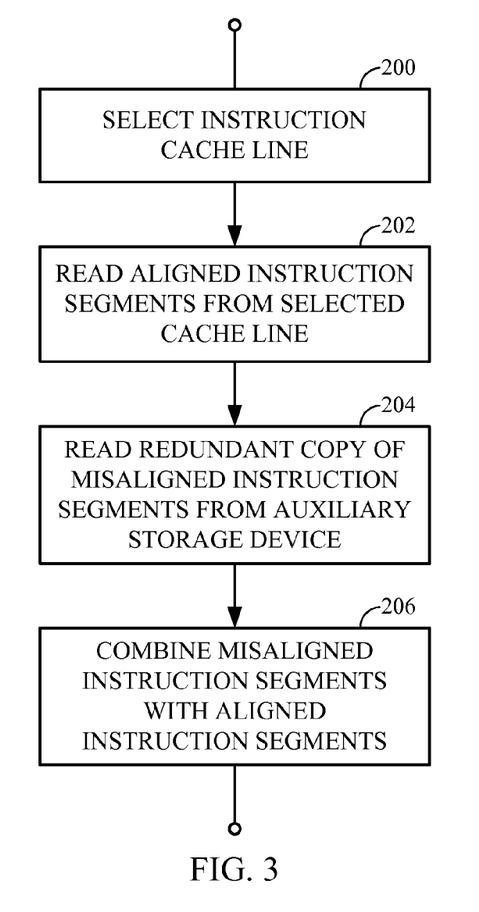
FIG. 3 is a logic flow diagram illustrating an embodiment of program logic for retrieving cached variable length instructions.

The controller 14 retrieves instructions stored in the instruction cache 10 by selecting the cache line containing a desired instruction, as illustrated by Step 200 of FIG. 3. For example, the controller 14 selects the first cache line 16 to retrieve the second variable length instruction having segments $B_0$ and $B_1$. The aligned segment $B_0$ of the second instruction is then read from the selected cache line 16, as illustrated by Step 202 of FIG. 3. The redundant copy of the misaligned instruction segment $B_1'$ of the second instruction is read concurrently from the auxiliary memory 12, as illustrated by Step 204 of FIG. 3. The complete instruction $B_0$ $B_1$ is reconstructed by combining the segment of the instruction read from the first cache line 16, $B_0$, with the misaligned segment of the instruction read from the auxiliary memory 12, $B_1'$. Step 206 of FIG. 3 illustrates such operations. With such operations, the controller 14 avoids the need for multiple cache accesses to retrieve misaligned, boundary-crossing instructions from the cache 10.

Figure 4:
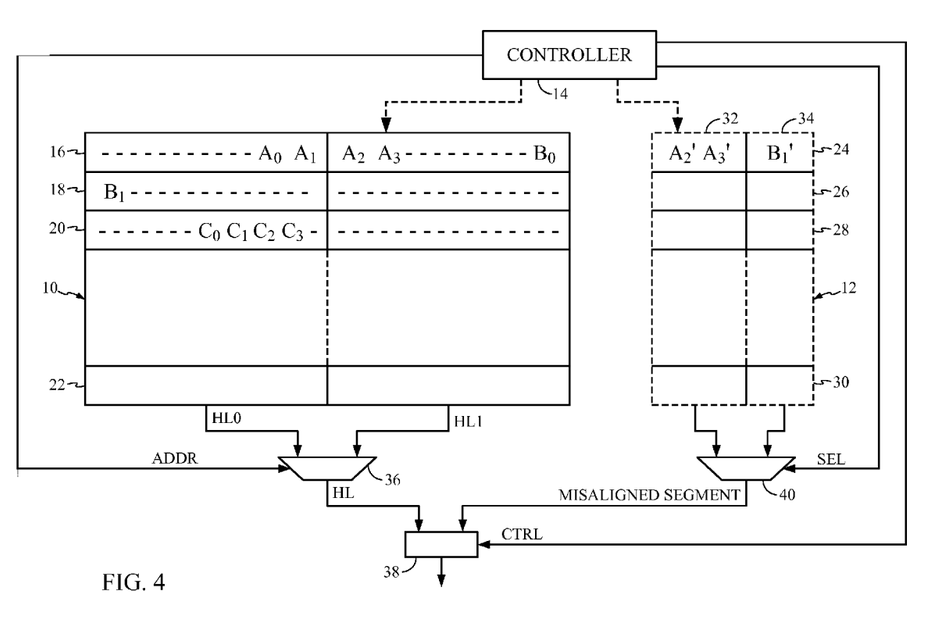
FIG. 4 is a block diagram illustrating another embodiment of an instruction cache and an auxiliary memory.

FIG. 4 illustrates one embodiment of circuitry included in or associated with the instruction cache 10 for retrieving variable length instructions from the cache 10 and the auxiliary memory 12. An instruction is retrieved by combining aligned segment(s) of the instruction read from a selected cache line of the instruction cache 10 with misaligned segment(s) of the instruction read from the auxiliary memory 12. Particularly, a first selection circuit 36, e.g., a multiplexer, identifies a sector of a selected cache line from which to retrieve the contents stored therein. For example, an address control input (ADDR) provided by the controller 14 causes the multiplexer 36 to choose a sector of a selected cache line of the instruction cache 10. As such, contents of the selected cache line sector are provided to a combiner circuit 38. In one embodiment where the cache lines are divided into two sectors, one of two half-lines of data (HL0 or HL1) is provided to the combiner circuit 38. In other embodiments, a different quantity of data is provided to the combiner circuit 38, where the quantity corresponds to the number of cache line sectors, e.g., ½ lines of data, ¼ lines of data, etc.

A second selection circuit 40, e.g., a second multiplexer, selects misaligned instruction segment(s) stored in the auxiliary memory 12 that correspond to the instruction segment(s) being retrieved from the instruction cache 10. For example, a column select signal (SEL) provided by the controller 14 causes the second selection circuit 40 to select the column of the auxiliary memory 12 to be accessed. If the auxiliary memory 12 comprises a single column of entries, the second selection circuit 40 is not needed. As such, the selected entry of the auxiliary memory 12 is provided to the combiner circuit 38. If the auxiliary memory contains more than one column of instruction segments per entry, e.g., two columns 32-34 as illustrated in FIG. 4, one of the columns is selected by the second selection circuit 40. The column selected corresponds to the type of boundary crossed by the instruction currently being retrieved from the instruction cache 10. For example, the second column 34 may store misaligned instruction segments that cross inter-cache line boundaries, and thus, is selected if the instruction comprising segments $B_0$ and $B_1$ is being retrieved from the instruction cache 10. As such, the redundant copy of the misaligned instruction segment $B_1'$ is concurrently retrieved from the auxiliary memory 12 while $B_0$ is retrieved from the instruction cache 10.

The combiner circuit 38, in response to a control signal (CTRL) provided by the controller 14, combines the selected output of the instruction cache 10 with the selected output of the auxiliary memory 12 to reconstruct the instruction being retrieved. When an instruction being retrieved does not cross a cache line boundary, e.g., the instruction having segments $C_0$-$C_3$ as illustrated in FIG. 4, the combiner circuit 38 does not combine the output of the instruction cache 10 with data stored in the auxiliary memory 12. Instead, the combiner circuit 38 outputs the data read only from the instruction cache 10 because the retrieved instruction is not misaligned.

When an instruction that spans a cache line boundary is being retrieved, the combiner circuit 38 may combine the selected outputs of the instruction cache 10 and the auxiliary memory 12 in a variety of ways. In one embodiment, the combiner circuit 38 shifts the instruction segment(s) retrieved from the cache 10 a number of bit positions corresponding to the bit width of the retrieved misaligned instruction segment(s) and then combines the shifted segment(s) with the misaligned segment(s). In another embodiment, the combiner circuit 38 appends the misaligned instruction segment(s) retrieved from the auxiliary memory 12 to the instruction segment(s) retrieved from the cache 10.

Regardless of the particular combining implementation, a variable length instruction crossing a cache line boundary is retrievable in one instruction cache access because the instruction cache 10 and the auxiliary memory 12 may be accessed concurrently. For example, the controller 14 retrieves the instruction comprising segments $B_0$ and $B_1$ in a single instruction cache access by selecting the half-line sector HL1 of the first cache line 16 and combining it with the misaligned instruction segment $B_1'$ retrieved from the auxiliary memory 12. As such, the output of the combiner circuit 38 includes the segment of the instruction stored in the instruction cache 10, $B_0$, combined with the redundant copy of the misaligned segment of the instruction stored in the auxiliary memory 12, $B_1'$. As a result, subsequent processing cycles are not needed to retrieve from the instruction cache 10 the segment of the instruction stored across the inter-cache line boundary, that is, segment $B_1$.

Figure 5:
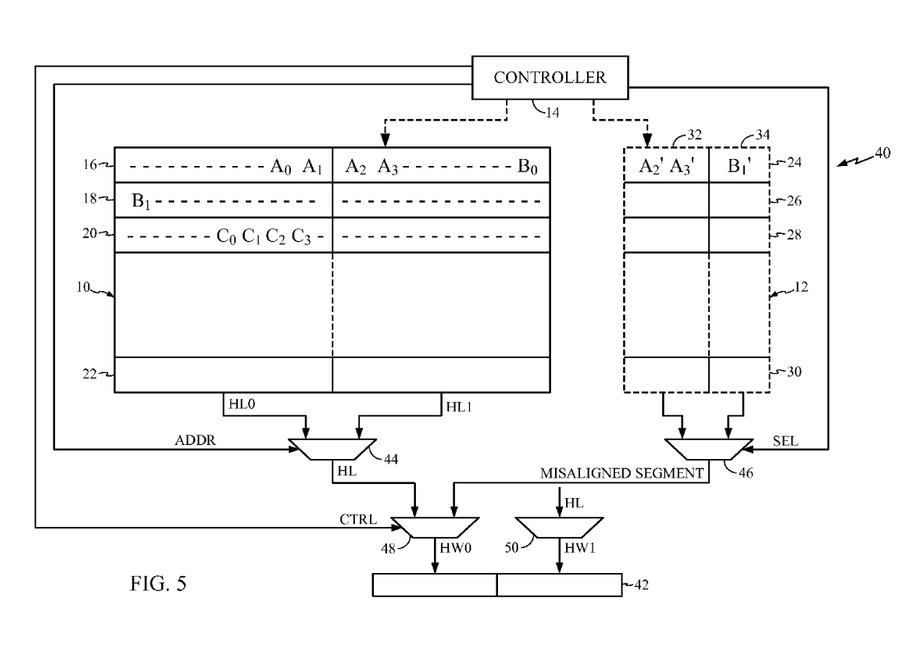
FIG. 5 is a block diagram illustrating yet another embodiment of an instruction cache and an auxiliary memory.

FIG. 5 illustrates another embodiment of circuitry included in or associated with the instruction cache 10 for retrieving variable length instructions from the cache 10 and the auxiliary memory 12 and also for providing retrieved instructions to a register 42. The register 42, e.g., an instruction register included in a microprocessor (not shown), has a defined width. Further, the register 42 stores desired sections of an instruction retrieved from the instruction cache 10. As such, desired sections of an instruction are selected from the instruction cache 10 and/or the auxiliary memory 12 and loaded into the register 42.

To that end, a first selection circuit 44, e.g., a first multiplexer, identifies a sector of a selected instruction cache line from which contents stored therein are retrieved. A second selection circuit 46, e.g., a second multiplexer, selects the corresponding redundant misaligned instruction segment(s) stored in the auxiliary memory 12. A third selection circuit 48, e.g., a third multiplexer, selects either the output read from the instruction cache 10 or the output read from the auxiliary memory 12 and provides the selected output to the register 42. In one embodiment, the third selection circuit 48 provides only a desired section of the selected output to the register 42, thereby accounting for the fixed size of the register 42. A pass-through device or latch circuit 50 passes the output read from a particular cache sector to the register 42. In one embodiment, the pass-through device or latch circuit 50 accounts for the fixed size of the register 42 by providing only a desired section of the selected output to the register 42.

In operation, the first selection circuit 44, in response to an address control input (ADDR) provided by the controller 14, selects one of the sectors of a particular cache line. The second selection circuit 46, in response to a column select signal (SEL) provided by the controller 14, selects the misaligned instruction segment(s), if any, that correspond to the instruction data stored at the selected cache line and sector. The third selection circuit 48, in response to a control signal (CTRL) provided by the controller 14, determines whether to select the data read from the instruction cache 10 or the data read from the auxiliary memory 12. In addition, the third selection circuit 48 provides the selected data or only a portion thereof to the register 42. The output of the third selection circuit 48 fills an upper portion of the register 42, e.g., an upper half-word portion. The output of the pass-through device or latch circuit 50 fills a lower portion of the register 42, e.g., a lower half-word portion. The circuit arrangement illustrated in FIG. 5 leverages the tendencies associated with cache line boundary crossovers. That is, a lower portion of a variable length instruction may be stored in a first sector of the instruction cache 10 while an upper portion of the instruction may be stored in a different sector or cache line, thus crossing a cache line boundary. Thus, the pass-through device or latch circuit 50 leverages this tendency and fills the lower portion of the register 42 with lower-order instruction data retrieved from the instruction cache 10. The third selection circuit 48 fills the upper portion of the register 42 with corresponding higher-order instruction data retrieved from the instruction cache 10 if the instruction selected for retrieval does not cross a cache line boundary.

Conversely, if the selected instruction does cross a cache line boundary, the third selection circuit 48 fills the upper portion of the register 42 with redundant higher-order instruction data retrieved from the auxiliary memory 12. As such, the register 42 may be loaded in a single access regardless of whether a particular instruction crosses a cache line boundary.

In a non-limiting example, the register 42 has a width of 32 bits and is divided into an upper half-word section and a lower half-word section. In addition, each instruction segment stored in the instruction cache 10 and the auxiliary memory 12 has a width of 16 bits. As such, to retrieve the instruction segments $A_1$ and $A_2$, the corresponding misaligned instruction segment $A_2'$ is read from the auxiliary memory 12 and loaded into the register 42 by the third selection circuit 48 as the upper half-word (HW1) of the register 42. Further, the other desired instruction segment, $A_1$, is read from the instruction cache 10 and concurrently loaded into the register 42 by the pass-through device or latch circuit 50 as the lower half-word (HW0) of the register 42. Thus, the register 42 is loaded in a single access even though the desired instruction crosses an intra-cache line boundary.

At this point, it is worth noting that the misaligned instruction segments stored in the auxiliary memory 12 are linked with corresponding aligned instruction segments stored in the instruction cache 10, thus enabling efficient retrieval of stored instructions. For example, in one embodiment, a particular row of the auxiliary memory 12 that contains a redundant copy of misaligned instruction segment(s) corresponds to or is linked with a row in the instruction cache 10 that contains the aligned segment(s) of the instruction.

Further, the capacity of the auxiliary memory 12 may correspond to any size data segments suitable for accommodating a desired number of instruction segments. As illustrated in FIG. 1, the auxiliary memory 12 is shown having two columns per entry: one column 32 for storing instruction segment(s) corresponding to intra-cache line boundary crossovers between sectors of the instruction cache and a second column 34 for storing instruction segment(s) corresponding to inter-cache line boundary crossovers. However, the auxiliary memory 12 may comprise any suitable number of columns for storing misaligned instruction segments, e.g., a single column that corresponds to the type of boundary crossover commonly to occur.

When the cache lines of the instruction cache 10 are divided into more than two sectors, the auxiliary memory 12 may be divided into multiple columns. One column may correspond to inter-cache line boundary crossovers and the remaining columns may correspond to the intra-cache line boundary crossovers associated with the multiplicity of cache line sectors. In another embodiment, the auxiliary memory 12 comprises a single column of entries that is dynamically configurable to store misaligned instruction segments that cross either intra-cache line boundaries or inter-cache line boundaries. As such, the single column of entries may contain a composite of misaligned instruction segments. Regardless of the particular organization of the auxiliary memory 12 and the instruction cache 10, the auxiliary memory 12 enables the retrieval of variable length instructions stored across instruction cache line boundaries during a single instruction cache access.

Figure 6:
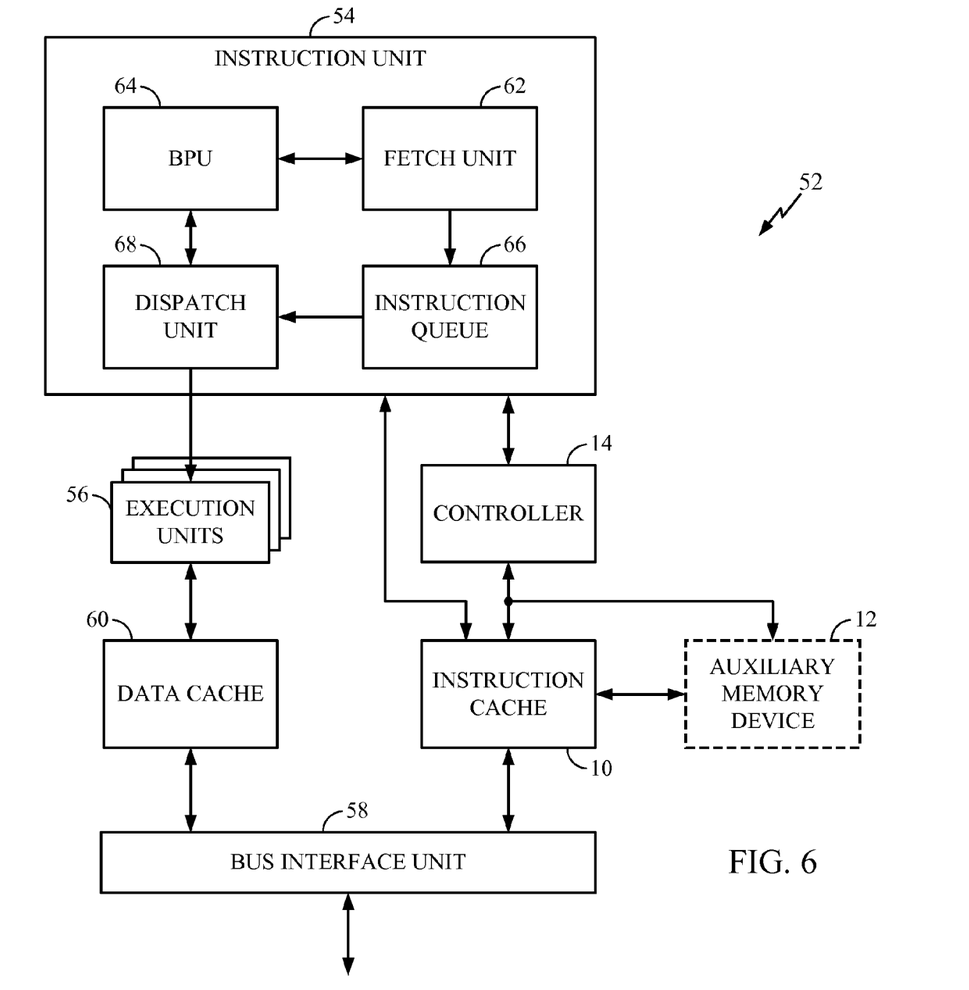
FIG. 6 is a block diagram illustrating an embodiment of a microprocessor including an instruction cache and an auxiliary memory.

FIG. 6 illustrates one embodiment of a microprocessor 52 including the instruction cache 10, auxiliary memory 12, and controller 14. The auxiliary memory 12 may be included in or associated with the instruction cache 10, e.g., one or more additional columns added to the cache 10, or included in, or associated with, a higher-level cache such as a level-two cache (not shown). Alternatively, the auxiliary memory device may be included in or associated with a tag array (not shown) associated with the instruction cache 10 or may be a separate memory array included in the processor 52. The processor 52 further includes an instruction unit 54, a plurality of execution units 56, a bus interface unit 58, and a data cache 60.

The instruction unit 54 provides centralized control of instruction flow to the execution units 56. The execution units 56, which may include one or more load/store units (not shown), floating point units (not shown), and integer units (not shown) may execute multiple instructions in parallel. As such, the processor 52 may be superscalar and/or super pipelined. The bus interface unit 58 provides a mechanism for transferring data, addresses, and control signals to and from the processor 52. The instruction and data caches 10, 60 enable the execution units 56 to rapidly access instructions and data, respectively.

In more detail, the instruction unit 54 includes an instruction fetch unit 62, a Branch Prediction Unit (BPU) 64, an instruction queue 66, and an instruction dispatch unit 68. The fetch unit 62 retrieves instructions from the instruction cache 10, decodes them, and loads the decoded instructions into the instruction queue 66. The instruction dispatch unit 68 dispatches queued instructions to the appropriate execution units 56. The BPU 64 detects branch instructions and, depending upon the type of branch detected, executes various branch prediction mechanisms, e.g., predicting branch target addresses and/or whether a particular branch is to be taken.

In one embodiment, the auxiliary memory 12, under control of the controller 14, stores post-boundary instruction data regardless of whether cache line boundary crossovers occur. As such, some instruction data contained in the auxiliary memory 12 may not be misaligned, and thus, not needed when retrieving instructions from the instruction cache 10. If an instruction is retrievable from the instruction cache in a single instruction cache access, the redundant segments stored in the auxiliary memory 12 may simply be ignored or discarded when such an instruction is retrieved. In another embodiment, the auxiliary memory 12, under control of the controller 14, selectively stores only misaligned instruction segments. According to this embodiment, the controller 14, in response to one of various indicators, selectively identifies only misaligned instruction segments for storage in the auxiliary memory 12.

In one embodiment of identifying misaligned instruction segments, instruction pre-decode information is used by the controller 14 to determine which instruction segments should be stored in the auxiliary memory 12. Pre-decode logic (not shown) included in the instruction unit 54 examines instructions as they are being written into the instruction cache 10. During instruction pre-decoding, the pre-decode logic identifies whether a cache line boundary will be crossed by the instruction presently being written into the cache 10.

In some embodiments, the pre-decode logic may determine the type of boundary crossing, i.e., an intra-cache line or an inter-line cache line boundary crossing. The controller 14, in response to an indication generated by the pre-decode logic, directs the auxiliary memory 12 to store a redundant copy of instruction segments that cross a cache line boundary. Further, if the auxiliary memory 12 includes multiple columns for storing different types of misaligned instruction segments, the pre-decode logic indicates to the controller 14 what type of cache line boundary is crossed. As such, the controller 14 directs the auxiliary memory 12 to store misaligned instruction segments in a particular column of the memory 12.

The pre-decode logic may be further configured to ascertain the instruction length of instructions being written to the instruction cache 10. As such, the controller 14 uses the instruction length information to determine whether a particular instruction will cross a cache line boundary. Alternatively, the controller 14 includes logic for determining the length of an incoming instruction. Regardless, the controller 14 uses instruction length information to determine if a particular instruction will cross a cache line boundary, and if so, manages the auxiliary memory 12 accordingly.

In another embodiment of identifying misaligned instruction segments, the controller 14 monitors the cache line entry location associated with an instruction being written to the instruction cache 10, i.e., the starting point in a cache line where the beginning of an instruction is written. The controller 14 determines whether a particular incoming instruction will cross a cache line boundary using cache line entry location information. For example, if the cache line entry location indicates that there are only two bytes left in a cache sector or cache line and a four-byte instruction is being written to that sector or line, either an intra or inter-cache line boundary crossing will occur. As such, the controller 14 may use this cache line entry information to determine if an incoming instruction will cross a cache line boundary, and if so, direct auxiliary storage of misaligned instruction segments.

In yet another embodiment of identifying misaligned instruction segments, the controller 14 uses information garnered from section(s) of an instruction fetched in advance of the remainder of the instruction to determine whether a cache line boundary crossing will occur. According to this embodiment, the instruction unit 54 requests certain portions of an instruction be fetched in advance of the remainder of the instruction, e.g., in response to a critical-word-first memory access operation or a critical-double-word-first memory access operation requested by the processor 52. In response to such operations, a portion of a desired instruction is fetched and examined before the remainder of the instruction is written into the instruction cache 10. The controller 14, or alternatively, logic included in the instruction unit 54, examines advanced portions of an instruction to determine whether the remainder of the instruction will cross a cache line boundary when subsequently written to the instruction cache 10. The controller 14 uses the information garnered by examining advanced instruction portions to determine if the remainder of the instruction will cross a cache line boundary, and if so, directs auxiliary storage of misaligned instruction segments as they are written into the instruction cache 10.

In still another embodiment of identifying misaligned instruction segments, historical misaligned instruction segment data is used by the controller 14 to predict whether a particular instruction being written to the instruction cache 10 will cross a cache line boundary. In a non-limiting example, the instruction unit 54 or controller 14 maintains a misaligned instruction segment history table (not shown) that includes cache line boundary crossing data associated with instructions previously written to the instruction cache 10. The history table may also include information that indicates whether the next instruction or instructions to be written to the cache 10 will cross a cache line boundary. The controller 14 uses the historical data to predict whether a particular instruction being written to the instruction cache 10 will cross a cache line boundary.

The historical data may be updated each time an instruction is written to the instruction cache 10 or may be updated less periodically. Further, historical misaligned instruction segment data may be modified based on whether a boundary prediction was correct, e.g., using a technique similar to those used to track and resolve branch predictions in a microprocessor.

With the above range of variations and applications in mind, it should be understood that the present disclosure is not limited by the foregoing description, nor is it limited by the accompanying drawings. Instead, the present disclosure is limited only by the following claims and their legal equivalents.

What is claimed is:

1. A method of caching variable length instructions, comprising:
    writing instruction data to a cache line; and
    storing a redundant copy of instruction data for one or more cache boundary positions.

2. The method of claim 1, wherein storing a redundant copy of instruction data for one or more cache boundary positions comprises copying to an auxiliary memory instruction data for one or more cache boundary positions.

3. The method of claim 2, wherein the auxiliary memory comprises one of a tag array associated with an instruction cache, one or more redundant memory elements included in or associated with the instruction cache, a separate memory array, and a higher-level cache.

4. The method of claim 2, wherein copying to an auxiliary memory instruction data for one or more cache boundary positions comprises copying instruction data for an intra-cache line boundary position to the auxiliary memory.

5. The method of claim 2, wherein copying to an auxiliary memory instruction data for one or more cache boundary positions comprises copying instruction data for an inter-cache line boundary position to the auxiliary memory.

6. The method of claim 1, wherein storing a redundant copy of instruction data for one or more cache boundary positions comprises:
    identifying a misaligned segment of an instruction included in the instruction data; and
    copying the misaligned segment to an auxiliary memory.

7. The method of claim 6, wherein identifying a misaligned segment of an instruction included in the instruction data comprises pre-decoding the instruction to identify a cross-boundary segment of the instruction.

8. The method of claim 6, wherein identifying a misaligned segment of an instruction included in the instruction data comprises processing a cache line entry location of the instruction to identify a cross-boundary segment of the instruction.

9. The method of claim 8, wherein the cache line entry location of the instruction corresponds to a fetch address associated with the instruction.

10. The method of claim 6, wherein identifying a misaligned segment of an instruction included in the instruction data comprises processing length information associated with the instruction to identify a cross-boundary segment of the instruction.

11. The method of claim 6, wherein identifying a misaligned segment of an instruction included in the instruction data comprises processing historical instruction misalignment data to identify a cross-boundary segment of the instruction.

12. The method of claim 6, wherein identifying a misaligned segment of an instruction included in the instruction data comprises processing a portion of the instruction fetched in advance of a remainder of the instruction to identify a cross-boundary segment of the instruction.

13. The method of claim 12, wherein the portion of the instruction fetched in advance of the remainder of the instruction comprises one of an instruction portion fetched responsive to a critical-word-first memory access operation and an instruction portion fetched responsive to a critical-double-word-first memory access operation.

14. An apparatus comprising a cache controller configured to direct storage of instruction data to a cache line included in an instruction cache and to direct storage of a redundant copy of instruction data for one or more cache boundary positions.

15. The apparatus of claim 14, wherein the cache controller is configured to direct storage of a redundant copy of instruction data for one or more cache boundary positions by copying to an auxiliary memory instruction data for one or more cache boundary positions.

16. The apparatus of claim 15, wherein the auxiliary memory comprises one of a tag array associated with the instruction cache, one or more redundant memory elements included in or associated with the instruction cache, a separate memory array, and a higher-level cache.

17. The apparatus of claim 15, wherein the cache controller is configured to copy to an auxiliary memory instruction data for one or more cache boundary positions by copying instruction data for an intra-cache line boundary position to the auxiliary memory.

18. The apparatus of claim 14, wherein the cache controller is configured to copy to an auxiliary memory instruction data for one or more cache boundary positions by copying instruction data for an inter-cache line boundary position to the auxiliary memory.

19. The apparatus of claim 14, wherein the cache controller is configured to direct storage of a redundant copy of instruction data for one or more cache boundary positions by identifying a misaligned segment of an instruction included in the instruction data and copying the misaligned segment to an auxiliary memory.

20. The apparatus of claim 19, wherein the cache controller is configured to identify a misaligned segment of an instruction included in the instruction data by processing pre-decoded information associated with the instruction to identify a cross-boundary segment of the instruction.

21. The apparatus of claim 19, wherein the cache controller is configured to identify a misaligned segment of an instruction included in the instruction data by processing a cache line entry location of the instruction to identify a cross-boundary segment of the instruction.

22. The apparatus of claim 21, wherein the cache line entry location of the instruction corresponds to a fetch address associated with the instruction.

23. The apparatus of claim 19, wherein the cache controller is configured to identify a misaligned segment of an instruction included in the instruction data by processing length information associated with the instruction to identify a cross-boundary segment of the instruction.

24. The apparatus of claim 19, wherein the cache controller is configured to identify a misaligned segment of an instruction included in the instruction data by processing historical instruction misalignment data to identify a cross-boundary segment of the instruction.

25. The apparatus of claim 19, wherein the cache controller is configured to identify a misaligned segment of an instruction included in the instruction data by using a portion of the instruction fetched in advance of a remainder of the instruction to identify a cross-boundary segment of the instruction.

26. The apparatus of claim 25, wherein the portion of the instruction fetched in advance of the remainder of the instruction comprises one of an instruction portion fetched responsive to a critical-word-first memory access operation and an instruction portion fetched responsive to a critical-double-word-first memory access operation.

27. The apparatus of claim 14, wherein the cache controller is further configured to retrieve an instruction included in the instruction data from the cache line by reading a segment of the instruction from the instruction cache and reading a misaligned segment of the instruction from an auxiliary memory.

28. The apparatus of claim 27, wherein the cache controller is further configured to combine the segment of the instruction read from the instruction cache with the misaligned segment of the instruction.

29. The apparatus of claim 28, wherein the cache controller is configured to combine the segment of the instruction read from the instruction cache with the misaligned segment of the instruction by appending the misaligned segment of the instruction to the segment of the instruction read from the instruction cache.

30. The apparatus of claim 28, wherein the cache controller is configured to combine the segment of the instruction read from the instruction cache with the misaligned segment of the instruction by selecting one of the misaligned segment of the instruction or a first portion of the segment of the instruction read from a first sector of the instruction cache and combining the selected one of the misaligned segment of the instruction or the first portion of the segment of the instruction read from the first sector of the instruction cache with a second portion of the instruction read from a second sector of the cache line.

31. A microprocessor, comprising:
    an instruction cache configured to store instruction data in a cache line included in the instruction cache; and
    a cache controller configured to direct storage of a redundant copy of instruction data for one or more cache boundary positions to an auxiliary memory.

32. The microprocessor of claim 31, wherein the one or more cache boundary positions comprise one or more of an intra-cache line boundary position of the instruction cache and an inter-cache line boundary position of the instruction cache.

33. The microprocessor of claim 31, wherein the auxiliary memory comprises one of a tag array associated with the instruction cache, one or more additional memory elements included in or associated with the instruction cache, a separate memory array, and a higher-level cache.

34. A method of retrieving cached variable length instructions, comprising:
    reading a segment of an instruction from a cache line; and
    reading a misaligned segment of the instruction from an auxiliary memory.

35. The method of claim 34, further comprising combining the misaligned segment of the instruction with the segment of the instruction read from the cache line.

36. The method of claim 35, wherein combining the misaligned segment of the instruction with the segment of the instruction read from the cache line comprises appending the misaligned segment of the instruction to the segment of the instruction read from the cache line.

37. The method of claim 35, wherein combining the misaligned segment of the instruction with the segment of the instruction read from the cache line comprises:
    selecting one of the misaligned segment of the instruction and a first portion of the instruction read from a first sector of the cache line; and
    combining the selected one of the misaligned segment of the instruction and the first portion of the instruction read from the first sector of the cache line with a second portion of the instruction read from a second sector of the cache line.

* * * * *